May 18, 1937. H. M. OLTZ 2,080,971
FREEZING AND DISPENSING MACHINE
Filed Nov. 6, 1935 2 Sheets—Sheet 1

HARRY M. OLTZ
INVENTOR
BY Leon T. Hooker
ATTORNEY

May 18, 1937.  H. M. OLTZ  2,080,971
FREEZING AND DISPENSING MACHINE
Filed Nov. 6, 1935　　2 Sheets-Sheet 2

HARRY M. OLTZ
INVENTOR
BY Leon T. Hooper
ATTORNEY

Patented May 18, 1937

2,080,971

UNITED STATES PATENT OFFICE 2,080,971

FREEZING AND DISPENSING MACHINE

Harry M. Oltz, Miami, Fla.

Application November 6, 1935, Serial No. 48,458

4 Claims. (Cl. 259—9)

This invention relates to an improved freezing and dispensing machine and has for its principal object the economical and efficient operation in freezing and dispensing large or small quantities of ice cream, or the like.

This application constitutes an improvement on a companion application for patent on a similar device entitled Freezing and dispensing machine, filed June 16, 1932, Serial Number 617,582.

One of the important objects of this invention is to provide a machine capable of being instantly dismantled for cleaning or visual inspection.

Another and further important object of this invention is the provision in a freezing and dispensing machine of means whereby all parts coming in contact with the mix may be readily and thoroughly cleaned.

Another object is to provide a machine of this kind wherein all parts of the conveyor and mixer have smooth and substantially flat surfaces to facilitate cleaning and promote sanitation.

Another and still further important object of this invention is the provision of means whereby the mechanism within the freezing chamber may be removed without disturbing any of the members on the drive end of the machine.

Another and further important object of this invention resides in the simplicity and efficiency of the means for maintaining the dispensing head in position.

An additional object of importance is the provision of means whereby the machine may be operated constantly with intermittent or no discharge of contents without stalling or building up an undue pressure in the discharge end of the freezing chamber.

Other and further important objects of this invention will be apparent from the disclosures in the accompanying drawings and the following specification.

The invention, in a preferred form, is illustrated in the drawings and hereinafter more fully described.

In the drawings:

Figure 7 is a vertical section of the shaft taken on line 7—7 of Fig. 3.

As shown in the drawings:

Figure 1:
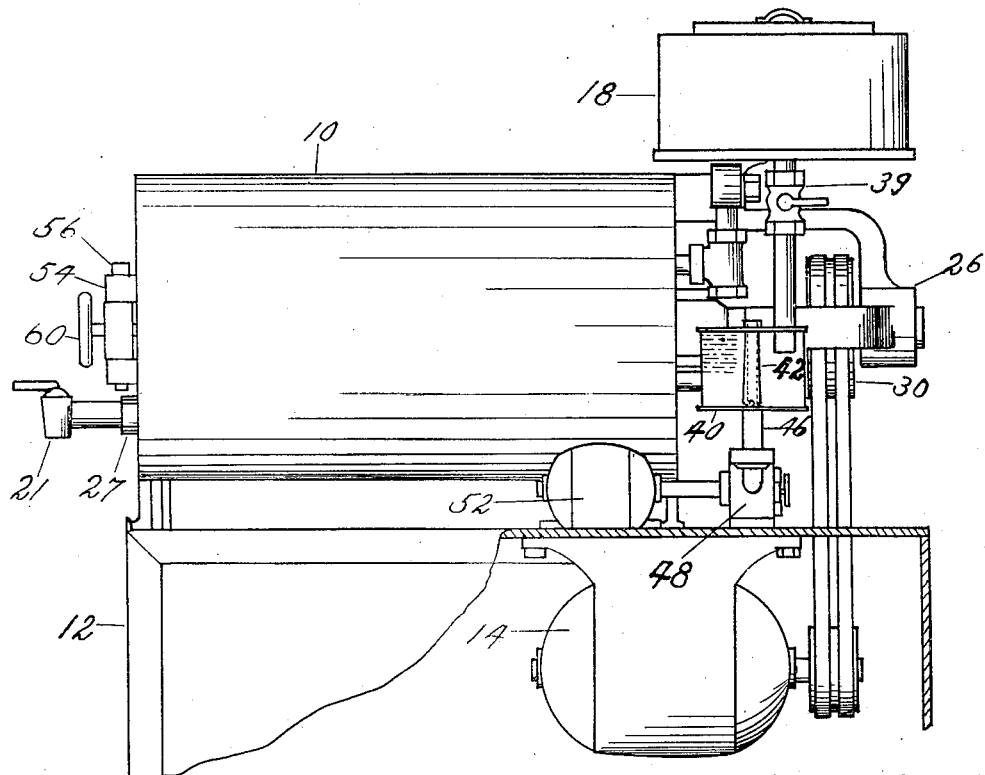
Figure 1 is a side elevation of the improved freezing and dispensing machine of this invention, parts being broken away.
Figure 2:
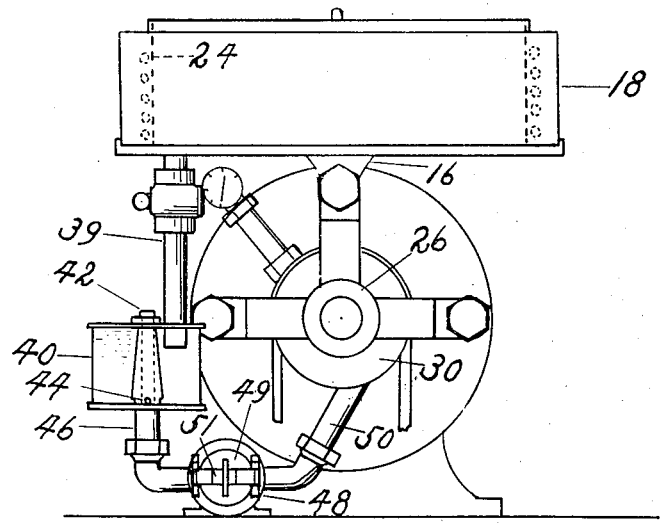
Figure 2 is a rear end elevation of the freezer itself, and shows the supply reservoir, pump, and transparent gauge cup, whereby flow of the mix can be watched.

The reference numeral 10 indicates in general the body of the freezing and dispensing machine of this invention which, in the preferred form, is mounted upon a cabinet 12, or other suitable housing for a driving motor 14. Positioned on a bracket 16 slightly above the body 10, is a supply reservoir 18 in which a supply of mix may be kept to feed into the machine.

Figure 3:
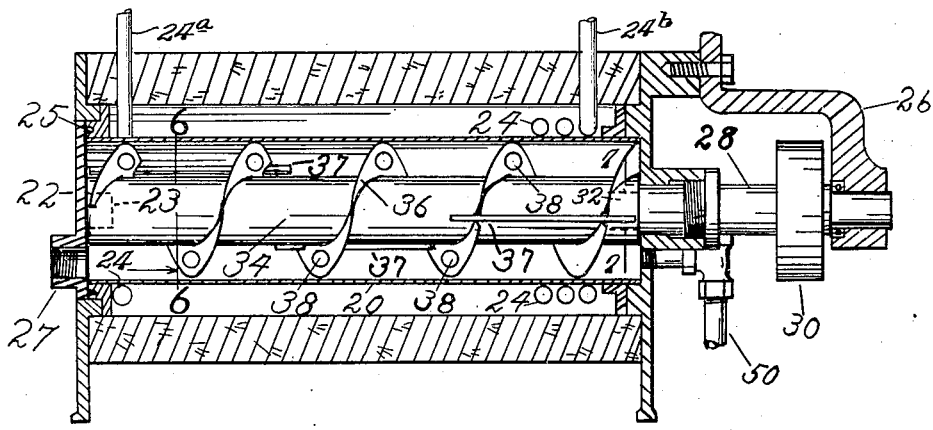
Figure 3 is a vertical sectional view of the machine with parts broken away and shows particularly the removable beating, conveying and extruding apparatus.
Figures 4, 6:
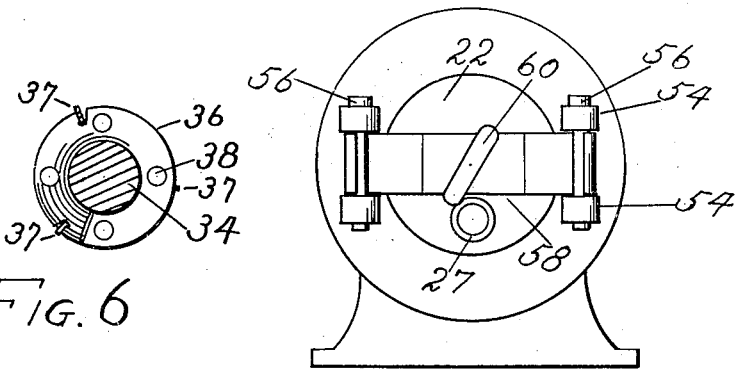
Figure 4 is a front end elevation of the device and shows the relative position of the freezing chamber head, securing mechanism, and extruding port.
Figure 6 is a section taken on line 6—6 of Figure 3, looking in the direction indicated by the arrow.
Figure 5:
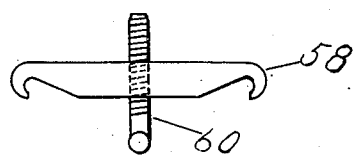
Figure 5 is a top plan view of a part of the freezing chamber head securing mechanism.

Extending longitudinally through the body of the machine is a freezing chamber 20, as is best shown in Figure 3.

Removably positioned on the front end of the chamber 20 is a head 22 which has on the inner surface thereof a centrally located boss or bearing 23 upon which a shaft may be centered and supported, as is clearly shown in the drawings. Dowel pins 25 extending from the inner face of the head adjacent its periphery provide a means for securing said head in its proper position. An extrusion port 27 threaded for the reception of a nipple for a dispensing faucet 21 is located at the bottom of the head, and when in position, aligns with the lower portion of the freezing chamber.

Between the inside face of the body 10 and the outside surface of the freezing chamber 20, a space is provided for a cooling medium which, in the preferred form, comprises coils 24 of a mechanical refrigeration unit. In the preferred embodiment of this invention, the coils are soldered or otherwise secured to the outside of the freezing chamber to prevent any possibility of an air pocket forming therebetween. The line forming this coil enters at the front of the machine at the point indicated by the reference numeral 24a and has an outlet 24b at the rear, to impart a more intense cold at the dispensing end of the freezing chamber. An extension of this unit is used for pre-cooling the mix contained in the supply reservoir 18.

Positioned on the rear end of the machine and supported by a bearing arm 26 is a drive shaft 28 which extends through the end of the body and into the freezing chamber 20. A pulley 30 is fixed to the drive shaft 28.

The portion of the drive shaft extending into the freezing chamber is restricted and square, as is best shown by the dotted lines and indicated by the reference numeral 32 in Figure 3.

Rotatably positioned within the freezing chamber and extending from the rear to the dispensing end is a removable shaft 34. The rear end of said shaft is recessed to fit and coact with the square restricted portion 32 of the drive shaft 28. When in operative position, the square end 32 of the shaft 28 supports and rotates the removable shaft 34.

A combination helical beater and conveyor 36 which in the preferred form, is integral with the shaft 34, extends therealong and as said shaft revolves, the combination beater and conveyor imparts a positive forward motion to the mix or the like within the freezing chamber.

Positioned in notches cut from the periphery of the conveyor 36 is a plurality of centrifugally acting scraper bars 37. Due to the fact that a more intense cold prevails at the bottom of the freezing chamber than at the top and consequently freezes the mix at the bottom harder and also because the mix more quickly adheres to this colder portion of the chamber, it has been found that a single scraping bar extending the length of the conveyors causes an exceedingly heavy strain on the driving mechanism and occasionally even stalls the machine. Therefore, the short scraping bars 37 are positioned on the periphery of the conveyor 36 at spaced intervals to more evenly distribute the load to the motor and to provide a more efficient and economical machine.

A plurality of openings 38 in the blade between the shaft and the outer edge of the conveyor provide a means for releasing excess pressure in the dispensing end of the machine, and also assist in producing a more thorough mixing and beating of the material within the freezing chamber.

A valved pipe line 39 extending from the bottom of the supply reservoir 18 into a transparent cup 40 conveys the mix by gravity into said cup. The cup 40 is provided with a hollow member 42 which extends upward through the top portion thereof. This member 42 is an extension of the discharge pipe and has a plurality of holes 44 in its sides near the bottom of the cup. This construction provides a means whereby the mix may run through the holes 44 to be discharged from the cup simultaneously with the passage of air through the hollow member 42 itself. The discharge pipe 46 secured to the lower end of the member 42 conveys the mix and air into an eccentric rotary pump 48 by which it is forced through the pipe 50 into the freezing chamber 20. The pump 48 is equipped with a quick detachable head 49 and securing mechanism 51 similar to the freezing chamber head and securing mechanism.

A motor 52 positioned adjacent the pump 48 and for driving the same, provides a means for maintaining a constant pressure within the freezing cylinder, regardless of the speed of the driving motor 14.

It will be apparent from this construction that the frozen mix may be dispensed intermittently and without the necessity of running the entire machine to build up pressure within the freezing chamber. Positioned on the extrustion end of the body adjacent the head 22, are four outward extending members 54 having aligned holes suitable for the reception of pins 56.

A cross piece 58 having recessed outer portions is adapted to be positioned behind the pins 56 and having a threaded member 60 extending therethrough, is utilized for holding the head 22 in position.

It will be obvious that with simplified construction of the mechanism for maintaining the dispensing head in position, the machine may be instantly opened for visual inspection or made ready for cleaning.

It will be further obvious from the foregoing that herein is provided a machine which is simple and rugged in construction and economical in operation, and moreover, meets with the strict sanitary requirements of the various State Board of Health Departments.

Furthermore, because of the simplicity of construction and the limited number of parts used, it may be set up, operated, and dismantled without the use of special tools or equipment by the ordinary person unskilled in the particular art.

I am aware that many changes may be made and numerous details of construction varied throughout a wide range without departing from the principles of this invention and I, therefore, do not purpose limiting the patent granted hereon otherwise than as necessitated by the prior art.

I claim as my invention:

1. A freezing and dispensing machine including a freezing cylinder having intake and discharge ports at opposed ends thereof, a removable shaft having a square indentation in one end thereof within said cylinder, an apertured conveyor on the shaft, the inner edge of said conveyor being secured to said shaft and the periferal edge thereof extending to a point closely adjacent the inner wall of the freezing cylinder, a permanently positioned shaft extending into the intake end of said cylinder, said removable shaft being in alignment with said permanent shaft and operably connected thereto, and means for rotating said conveyor.

2. In a freezing and dispensing machine having a horizontal cylinder, an apertured beater and conveyor member rotatably positioned within said cylinder, said member being capable of maintaining a quantity of frozen mix under extruding pressure at the discharge end of said cylinder, a plurality of scraper blades in association with the edges of said beater and conveyor member, said apertured beater and conveyor member providing automatic means for releasing excessive pressure within the head end of said cylinder and an apertured head detachably positioned on the discharge end of said cylinder.

3. A combination mixer and conveyor for a freezing machine comprising a shaft, a supporting indentation on each end of said shaft, an apertured helical conveyor secured to said shaft and extending the entire length thereof, and a plurality of overlapping scraping blades in association with the edges of said helical conveyor.

4. A combination mixer and conveyor for a freezing machine comprising a shaft, a square shaft receiving indentation in one end of said shaft and a circular bearing receiving indentation in the other end thereof, an apertured screw conveyor secured to said shaft, and a plurality of scraping blades in association with the edges of the screw conveyor and parallel to the shaft.

HARRY M. OLTZ.